(12) United States Patent
De Haro et al.

(10) Patent No.: US 11,463,186 B2
(45) Date of Patent: Oct. 4, 2022

(54) USER-REQUESTED MESSAGE TRANSMISSION TO DEVICES NEAR A SECOND DEVICE

(71) Applicant: Pycom Ltd, Guildford (GB)

(72) Inventors: Frederick De Haro, Guildford (GB); Daniel Campora, Guildford (GB)

(73) Assignee: Pycom Ltd

( * ) Notice: Subject to any disclaimer, the term of this patent is extended or adjusted under 35 U.S.C. 154(b) by 127 days.

(21) Appl. No.: 16/898,626

(22) Filed: Jun. 11, 2020

(65) Prior Publication Data
US 2020/0403718 A1 Dec. 24, 2020

(30) Foreign Application Priority Data
Jun. 21, 2019 (EP) .................................. 19181727

(51) Int. Cl.
*H04H 20/71* (2008.01)
*H04H 60/52* (2008.01)
(Continued)

(52) U.S. Cl.
CPC ............ *H04H 60/52* (2013.01); *H04H 20/59* (2013.01); *H04H 60/87* (2013.01); *H04H 60/90* (2013.01)

(58) Field of Classification Search
CPC ........ H04H 60/52; H04H 20/59; H04H 60/87; H04H 60/90; H04W 4/021; H04W 4/02; H04W 4/029; H04W 4/06; H04W 4/12; H04W 4/14; H04W 4/90; H04W 8/005; H04W 84/12; H04W 4/027; H04W 64/00; H04W 4/80; H04W 84/18; H04W 4/70; H04W 52/0216; H04W 52/0229; H04W 12/08; H04W 12/47; H04L 51/20; H04L 51/24; H04L 67/18; H04L 67/20; H04L 67/22; H04L 67/42; H04L 12/12; H04L 25/02; H04L 27/06; H04L 63/08;
(Continued)

(56) References Cited

U.S. PATENT DOCUMENTS 4,742,357 A * 5/1988 Rackley .................... G01S 5/10
340/8.1
4,835,665 A * 5/1989 Kao .................... F21V 33/0064
362/208
(Continued)

FOREIGN PATENT DOCUMENTS

KR 10-2015-0006494 A 1/2015

OTHER PUBLICATIONS

Extended European Search Report for corresponding European application No. 19181727.9; dated Dec. 18, 2019 (9 pages).

*Primary Examiner* — Stephen M D Agosta
(74) *Attorney, Agent, or Firm* — Mendelsohn Dunleavy, P.C.

(57) ABSTRACT

An electronic device of the invention is configured to allow a user of a first device to request transmission of a message, obtain a location of a second device, and transmit the message to devices within a certain range of the second device. The first device may be carried by a person who wants to retrieve a missing person, animal, or object. The second device may be carried by the missing person or missing animal or attached to or incorporated into the missing object. The message may be transmitted by the first device, by the second device, and/or by an Internet server, for example.

7 Claims, 10 Drawing Sheets

(51) Int. Cl.
*H04H 20/59* (2008.01)
*H04H 60/87* (2008.01)
*H04H 60/90* (2008.01)

(58) Field of Classification Search
CPC ... H04L 63/0853; H04L 63/102; H04L 51/38; H04L 67/306; G01S 13/74; G01S 19/16; G01S 5/0009
See application file for complete search history.

(56) References Cited

U.S. PATENT DOCUMENTS

| | | | | |
|---|---|---|---|---|
| 6,014,610 | A * | 1/2000 | Judge | G01C 17/38 702/92 |
| 9,131,338 | B2 * | 9/2015 | Sharma | H04W 4/027 |
| 9,772,679 | B1 * | 9/2017 | Schiewe | G06F 3/0346 |
| 2002/0126010 | A1 * | 9/2002 | Trimble | G06K 7/10079 340/568.1 |
| 2004/0183674 | A1 * | 9/2004 | Ruvarac | G08B 21/0269 382/118 |
| 2005/0005874 | A1 * | 1/2005 | Light | G08B 13/1427 119/719 |
| 2005/0012624 | A1 * | 1/2005 | Charen | G08B 21/0202 340/573.4 |
| 2005/0073420 | A1 * | 4/2005 | Kazdin | G08B 21/0261 340/573.4 |
| 2005/0134907 | A1 * | 6/2005 | Obuchi | H04N 19/423 358/1.15 |
| 2006/0130100 | A1 * | 6/2006 | Pentland | H04N 21/4524 725/68 |
| 2006/0201447 | A1 * | 9/2006 | Meadows | G06Q 50/10 119/720 |
| 2006/0208909 | A1 * | 9/2006 | Schoppmeyer | G08B 21/22 340/7.5 |
| 2007/0036445 | A1 * | 2/2007 | Lu | H04N 19/91 382/238 |
| 2007/0102527 | A1 * | 5/2007 | Eubank | H04M 11/04 235/492 |
| 2007/0139182 | A1 * | 6/2007 | O'Connor | H04W 4/90 340/539.22 |
| 2007/0280547 | A1 * | 12/2007 | Mitsui | H04N 19/94 382/253 |
| 2010/0042430 | A1 * | 2/2010 | Bartfeld | G06Q 10/10 705/2 |
| 2010/0090838 | A1 * | 4/2010 | Robinson | G08B 27/001 707/E17.001 |
| 2011/0187527 | A1 | 8/2011 | Goodwill et al. | |
| 2012/0238234 | A1 | 9/2012 | Duarte | |
| 2013/0260785 | A1 * | 10/2013 | Shakespeare | G01S 5/20 455/456.1 |
| 2014/0085445 | A1 * | 3/2014 | Joao | G01C 21/3679 348/61 |
| 2014/0372443 | A1 * | 12/2014 | Delaney | G06F 21/6218 382/118 |
| 2015/0063711 | A1 * | 3/2015 | Briggs | G06V 20/52 382/203 |
| 2015/0334994 | A1 | 11/2015 | Prasad | |
| 2016/0063836 | A1 * | 3/2016 | Fishwick | G08B 21/0272 340/8.1 |
| 2016/0209491 | A1 * | 7/2016 | Klein | H04W 64/006 |
| 2017/0084151 | A1 * | 3/2017 | Beaty | G08B 21/0227 |
| 2017/0215034 | A1 | 7/2017 | Blowers et al. | |
| 2018/0091640 | A1 * | 3/2018 | Fulton | G16H 40/67 |

* cited by examiner

USER-REQUESTED MESSAGE TRANSMISSION TO DEVICES NEAR A SECOND DEVICE

FIELD OF THE INVENTION

The invention relates to an electronic device for transmitting a message.

The invention further relates to a method of transmitting a message.

The invention also relates to a computer program product enabling a computer system to perform such a method.

BACKGROUND OF THE INVENTION

The discussion below is merely provided for general background information and is not intended to be used as an aid in determining the scope of the claimed subject matter.

Unfortunately, a missing pet or a missing child is not an uncommon occurrence. A child may have gotten lost at a beach, in a shopping mall or in an amusement park, for example. There are several Internet applications for locating a child or a pet, e.g. using GPS. The child or pet may carry a special tracking device which transmits the child or pet's GPS location to a device of the child's parent or pet's owner or to an Internet server, e.g. via a cellular communication network such as CDMA2000, UMTS or LTE. This technique is also disclosed in US 2011/0187527 A1. A drawback of this technique is that a child's parent or a pet's owner first needs to go to the identified location and it may therefore take some time to retrieve the child or pet.

Another example of a pet localization application is disclosed in US2015/0334994 A1. US 2015/03334994 A1 disclose a specialized pet tag which integrates with a mobile software application development for a smart phone or mobile device. Someone who finds a missing pet can scan the pet tag with his mobile device and the mobile devices then automatically notifies the owner of the pet. Furthermore, this application allows a user to send an alert to all shelters and organizations that are near the owner of the pet. A drawback of this application that a shelter or vet first needs to capture the pet and it may therefore take some time to retrieve the pet

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect of the invention, the method of transmitting a message comprises allowing a user of a first device to request transmission of a message, obtaining a location of a second device, and transmitting said message to devices within a certain range of said second device. Said method may be performed by software running on a programmable device. This software may be provided as a computer program product.

The inventors have recognized that employing the help of other people allows a missing person, animal or object to be retrieved faster if these other people are near the missing person, animal, or object. A person who wants to retrieve the missing person, animal, or object uses his first device to request transmission of a message to devices near the second device, which is typically carried by the missing person or missing animal or attached to or incorporated into the missing object. The message preferably comprises an image, e.g. a photo of the missing animal, person or object. The message may further comprise the location of the second device, e.g. GPS coordinates or a map on which the location is marked. In case of a missing pet, the message may further comprise an ID, name, breed, size/weight and/or color of the pet, for example.

Said message may be transmitted by said first device. By letting the first device join a non-cellular network and transmit the message to the devices near the second device itself, it may be possible to reduce the cost of using cellular communication networks.

Said message may be transmitted by said second device. By letting the second device transmit the message to the devices near the second device, it is not necessary to obtain the locations of nearby devices. On many devices, it is possible to disable the sharing of location information. Instead, the second device may broadcast the message. The second device not connecting, or not even being able to connect, to a cellular communication network has the advantage that it may reduce costs. However, this would mean that it takes somewhat longer for the message to be transmitted, as it takes somewhat longer for the request to transmit the message to travel from the first device to the second device.

A nearby device receiving said broadcast may rebroadcast said message in dependence on a distance between a current location of said nearby device and said location of said second device. This allows the message to reach devices outside the second device's own wireless range without reaching too many devices outside the certain range targeted by the message.

Said message may be transmitted by an Internet server. Although this may increase service costs and may result in (more) use of cellular communication networks, which also increases costs, the use of an Internet (e.g. cloud) server may allow larger images to be transmitted, e.g. if the first device and/or the second device are only connected to a Long Range (LoRa) mesh network.

Said first device and/or said second device may transmit an image of a first size to at least one of said devices within said certain range of said second device and said Internet server may transmit an image of a second size to at least one of said devices within said certain range of said second device, said second size being larger than said first size. Said Internet server may transmit said image of said second size to one or more devices connected to said Internet server and said first device and/or said second device may transmit said image of said first size to one or more devices not connected to said Internet server. Said second size may be at least ten times larger than said first size, for example. Said first size may be less than 2 KB and said first size may be more than 50 KB, for example.

A device may be able to connect to and stay connected to the Internet server when it is connected to a wireless LAN access point and/or a cellular communication network and may not be able to connect to and/or stay connected to the Internet server when it is not connected to a wireless LAN access point or a cellular communication network, e.g. when it is only connected to a LoRa mesh network. Since devices only connected to a LoRa mesh network are normally only able to receive small files, it is beneficial to transmit only small images to devices not connected to the Internet server, while large images may be transmitted to devices which are connected to the Internet server.

Said method may further comprise identifying said devices within said certain range of said second device based on known locations of a plurality of devices. A known location of a device may be the current location of the device, e.g. if the device is connected to the Internet server, or the last known location of the device, e.g. if the device is not connected to the Internet server. A device only connected to a LoRa network may be able to communicate with an Internet server, but the device may not be able to connect to and/or stay connected to the Internet server as a result of the higher communication latency of the LoRa network.

Said plurality of devices may be associated with a plurality of users and said plurality of users may be associated with said user of said first device. Thus, the plurality of users may be friends and/or contacts of said user of said first device. Alternatively, said plurality of users may be associated with an application used by said user of said first device to request transmission of said message, for example. Said application may be a pet tracking application, for example. All users that have subscribed to this pet tracking application may be able to receive messages relating to missing pets, for example. Alternatively, said user of said first device and said plurality of users may use and be associated with the same type of device, for example.

Said method may further comprise obtaining a movement direction of said second device and said devices within said certain range of said second device may be further identified based on said movement direction of said second device. This makes it possible to target the message better, e.g. only to devices moving in the direction of the second device (i.e. of the missing person, animal or object).

Said method may further comprise obtaining movement directions of one or more of said plurality of devices and wherein said devices within said certain range of said second device are further identified based on said movement directions of said one or more of said plurality of devices. This makes it possible to target the message even better, e.g. only to devices expected to come very close to the second device (i.e. to the missing person, animal or object) based on the current trajectories of these devices and the second device.

In a second aspect of the invention, the electronic device comprises at least one processor configured to allow a user of a first device to request transmission of a message, obtain a location of a second device, and transmit said message to devices within a certain range of said second device. The electronic device may be the first device, the second device or an Internet server, for example.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores a software code portion, the software code portion, when executed or processed by a computer, being configured to perform executable operations comprising: allowing a user of a first device to request transmission of a message, obtaining a location of a second device, and transmitting said message to devices within a certain range of said second device.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Python, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
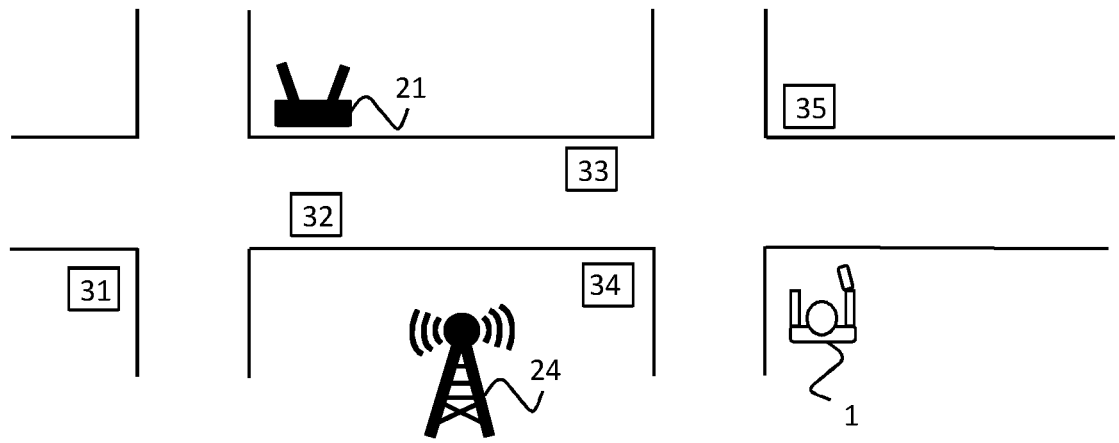
FIG. 1 depicts an example of a situation in which the invention may be used, including user devices and infrastructure devices.
Figure 1:
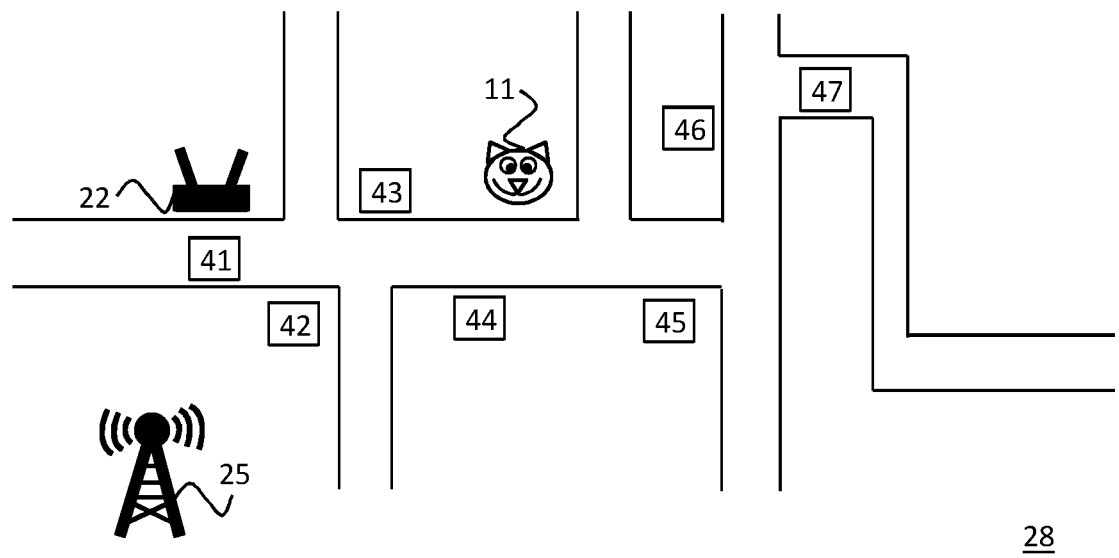

FIG. 1 shows an example of a situation in which the invention may be used. FIG. 1 depicts two spatial areas: a spatial area 27 and a spatial area 28. Six user devices in spatial area 27 form a first subarea of a mesh network: device 1 and devices 31-35. Two gateways to the Internet are present in spatial area 27: a wireless LAN Internet access point 21 and a base station 24 of a cellular communication network, e.g. an UMTS, LTE or CDM2000 network. Device 1, also referred to as first device, is carried by a person who wants to retrieve a missing person, animal or object (a cat in the example of FIG. 1). Device 1 may be a mobile phone or a dongle for use with a mobile phone, for example.

Eight user devices in spatial area 28 form a second subarea of a mesh network: device 11 and devices 41-47. Two gateways to the Internet are present in spatial area 27: a wireless LAN Internet access point 22 and a base station 25 of a cellular communication network, e.g. an UMTS, LTE or CDM2000 network. Device 11, also referred to as second device, is attached to a cat, e.g. embedded in its collar. In the embodiment of FIG. 1, device 11 is a different type of device than device 1. Each of devices 31-35 and 41-47 may be of the same type as device 1 or device 11 or may be of a different type.

Figure 2:
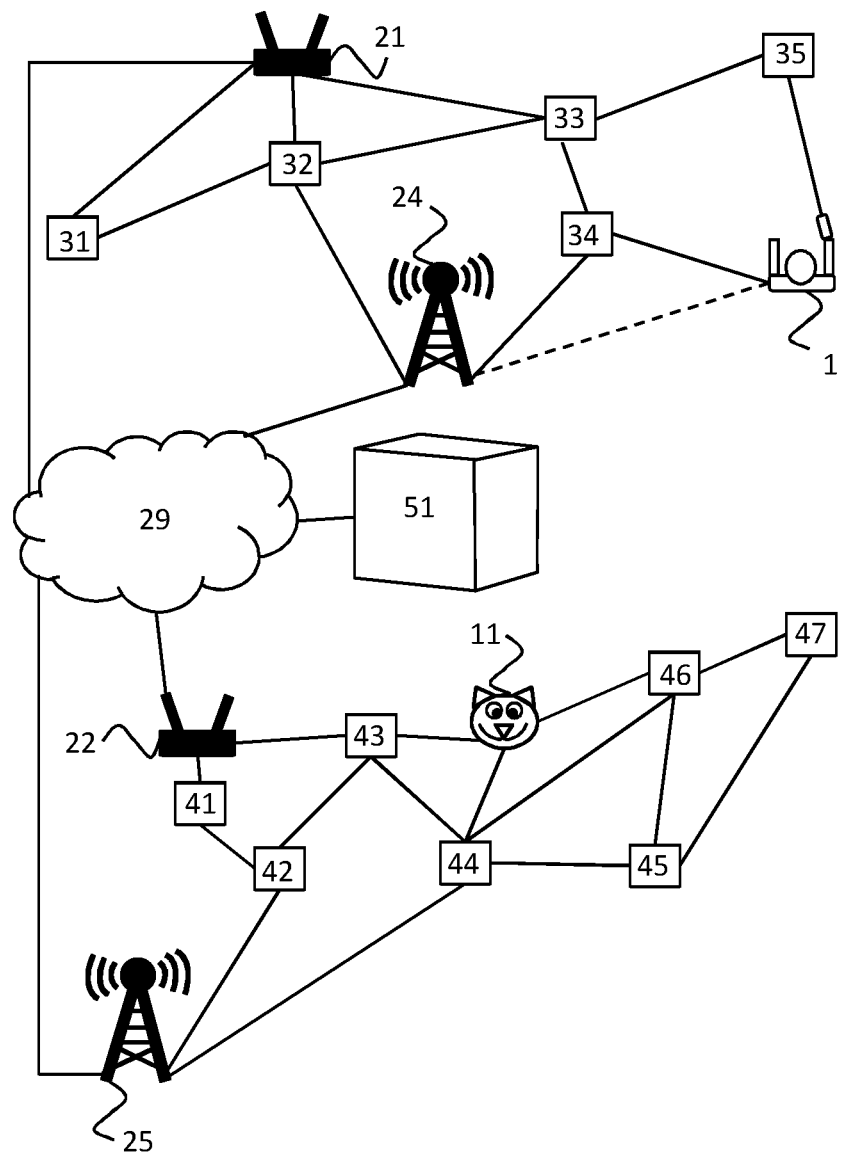
FIG. 2 depicts the devices of FIG. 1 participating in a mesh network.

FIG. 2 depicts the parts of a mesh network that are formed by the devices of FIG. 1. In the mesh network of FIG. 1, not only infrastructure devices (gateway devices 21-25) are responsible for routing data, but also user devices. In the embodiment of FIG. 2, all user devices route data. In an alternative embodiment, only certain types of user devices route data. Both infrastructure devices and user devices are referred to as nodes of the mesh network. In the embodiment of FIG. 2, the user devices are able to communicate with each using Long Range (LoRa) wireless technology. In an alternative embodiment, a different wireless technology may be used.

A user device is typically able to transmit data to multiple other user devices, but it is not required to transmit data to multiple other user devices. For example, a user device may always transmit to the other user device from which the strongest signal is received. The solid lines between the user devices shown in FIG. 2 represent that these user devices are within range of each other and are able to communicate directly with each other. A solid line between a user device and an infrastructure device represents that this user device is connected to this infrastructure device. A dashed line between a user device and an infrastructure device represents that this user device is able to connect to this infrastructure device.

In the example of FIG. 2, user device 1 is able to transmit to user devices 34 and 35, user device 31 is able to transmit to user device 32, user device 32 is able to transmit to user devices 31 and 33, user device 33 is able to transmit to user devices 32, 34 and 35, user device 34 is able to transmit to user devices 1 and 33, and user device 35 is able to transmit to user devices 1 and 33. Furthermore, user devices 31, 32 and 33 are connected to wireless LAN access point 21 and user devices 32 and 34 are connected to base station 24. User device 1 is not connected to base station 24, but it is able to connect to base station 24.

In the example of FIG. 2, user device 11 is able to transmit to user devices 43, 44 and 46, user device 41 is able to transmit to user device 42, user device 42 is able to transmit to user devices 41 and 43, user device 43 is able to transmit to user devices 11, 42 and 44, user device 44 is able to transmit to user devices 11, 43, 45 and 46, user device 45 is able to transmit to user devices 44, 46 and 47, user device 46 is able to transmit to user devices 11, 44, 45 and 47, and user device 47 is able to transmit to user devices 45 and 46. Furthermore, user devices 41 and 43 are connected to wireless LAN access point 22 and user devices 42 and 44 are connected to base station 25.

In the example of FIGS. 1 and 2, the nodes in subarea 27 form a first part of the mesh network and the nodes in subarea 28 form a second part of the mesh network. The two parts are connected via the Internet 29. User nodes are either directly connected to the Internet, e.g. via one or more infrastructure devices, or they are able to communicate with devices on the Internet, e.g. Internet server 51, via other user devices. User nodes in one part of the mesh network are able to communicate with user nodes in another part of the mesh network via the Internet 29. The different parts of the mesh network could also be considered to be different mesh networks.

Figure 3:
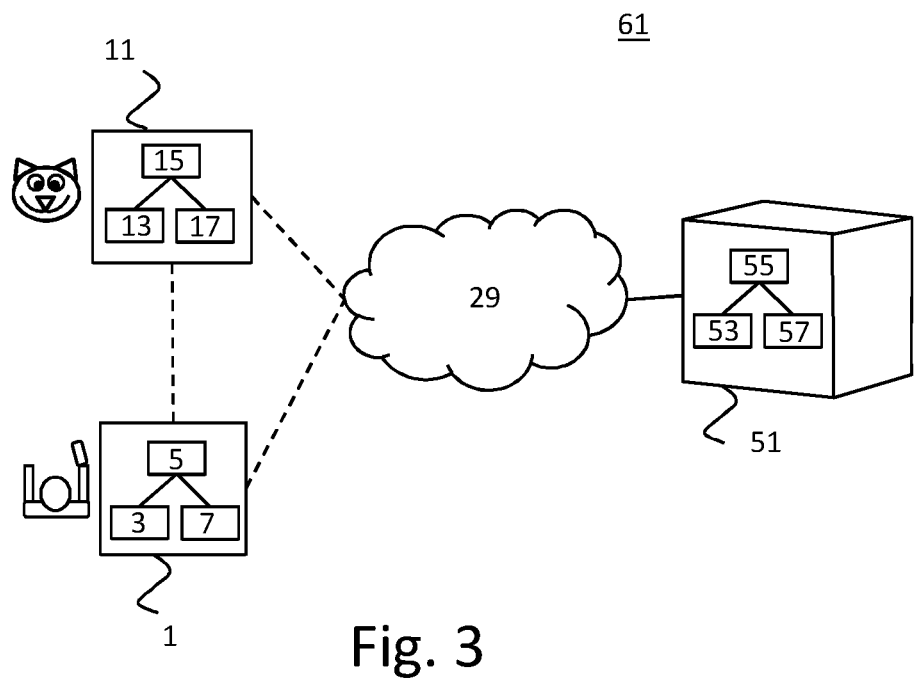
FIG. 3 is a block diagram of three embodiments of the electronic device of the invention.

Three embodiments of the electronic device of the invention are shown in FIG. 3. In FIG. 3, the message is transmitted by all of the user device 1, the user device 11 and the Internet server 51 and all three embodiments are depicted in a single system 61. In an alternative embodiment of the system, only one or two of the three embodiments may be present in the system. For example, only the user device 1, the user device 11 or the Internet server 51 may transmit the message or only the user device 1 and the Internet server 51 may transmit the message.

The user device 1 comprises a processor 5, a transceiver 3 and a memory 7. The user device 1 may be a mobile phone or a dongle for a mobile phone, for example. The user device 11 comprises a processor 15, a transceiver 13 and a memory 17, for example. The user device 11 may be embedded in the collar of a pet, for example. The Internet server 51 comprises a processor 55, a transceiver 53 and a memory 57. The processors 5, 15 and 55 are configured to allow a user of a first device, the user device 1, to request transmission of a message, obtain a location of a second device, the user device 11, and transmit the message to devices within a certain range of the second device, the user device 11.

In the embodiment shown in FIG. 3, the user devices 1 and 11 and the Internet server 51 comprise one processor. In an alternative embodiment, one or more of the user devices 1 and 11 and the Internet server 51 comprise multiple processors. The processors 5, 15 and 55 may each be a general-purpose processor or an application-specific processor, for example. One or more of the processors 5, 15 and 55 may comprise multiple cores, for example. In the embodiment shown in FIG. 3, a receiver and a transmitted have been combined in single transceivers 3, 13 and 53. In an alternative embodiment, a transceiver may be replaced with a separate receiver and transmitter. The transceivers 3, 13 and 53 may use one or more communication technologies to communicate with other devices. The memories 7, 17 and 57 may comprise solid state memory, for example.

The processor 55 of the Internet server 51 may be an Intel or AMD processor, example. The processor 15 may run a Unix-based or Windows operating system, for example. The Internet server 51 may be connected to the Internet 29 via an Ethernet connection, for example. The memory 57 may comprise one or more hard disks, for example. The Internet server 51 may comprise other components typical for a server, e.g. a power supply. In the embodiment of FIG. 3, the Internet server 51 comprises one device. In an alternative embodiment, the Internet server 51 comprises multiple devices.

The processors 5 and 15 of the user devices 1 and 11 may be ARM-based processors, for example. The processor 5 may run Google Android or Apple iOS as operating system, for example. The user device 11 may be more lightweight than the user device 1, e.g. when it needs to be carried by a child or a pet. The processor 15 of the user device 11 may or may not run an operating system. The transceivers 5 and 15 of the user device 11 preferably support non-cellular communication technologies such as Wi-Fi and/or LoRa and may support cellular communication technology, e.g. CDMA2000, UMTS or LTE. The transceiver 5 of the user device 1 may support Bluetooth technology in order to communicate with a mobile phone to which the user device 11 is connected if the user device 1 is a dongle, for example. The user devices 1 and 11 may comprise other components typical for a user device, e.g. a battery.

Figure 4:
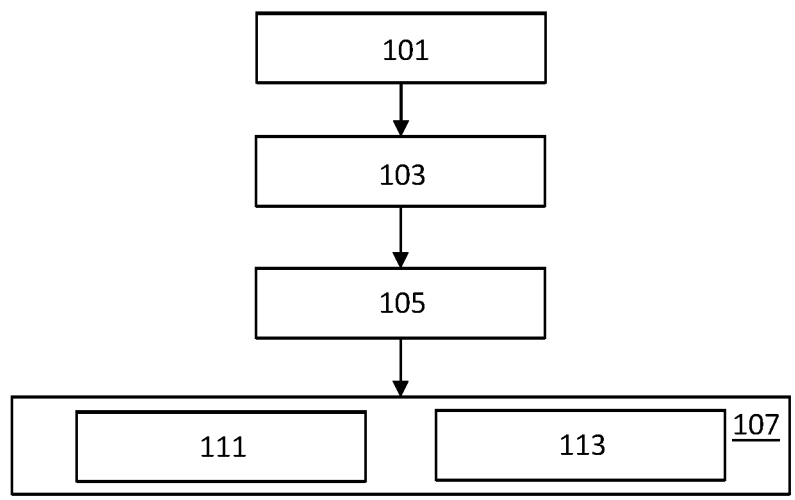
FIG. 4 is a flow diagram of a first embodiment of the method of the invention.

A first embodiment of the method of the invention is shown in FIG. 4. A step 101 comprises allowing a user of a first device to request transmission of a message. A step 103 comprises obtaining a location of a second device. A step 107 comprises transmitting the message to devices within a certain range of the second device. In the embodiment of FIG. 4, a step 105 is performed between steps 103 and 107. Step 105 comprises identifying the devices within the certain range of the second device based on known locations of a plurality of devices. The plurality of devices is associated with a plurality of users. The plurality of users may be associated with the user of the first device, with an application used by the user of the first device to request transmission of the message or with a similar type of device as the first device, for example.

In the embodiment of FIG. 4, step 107 comprises sub steps 111 and 113. Step 111 comprises the first device and/or the second device transmitting an image of a first size to at least one of the devices within the certain range of the second device. Step 113 comprises the Internet server transmitting an image of a second size to at least one of the devices within the certain range of the second device. The second size is larger than the first size. In the embodiment of FIG. 4, steps 111 and 113 are performed in parallel. However, in an alternative embodiment, steps 111 and 113 are performed in sequence, e.g. first step 111 and then step 113 or first step 113 and then step 111.

Figure 5:
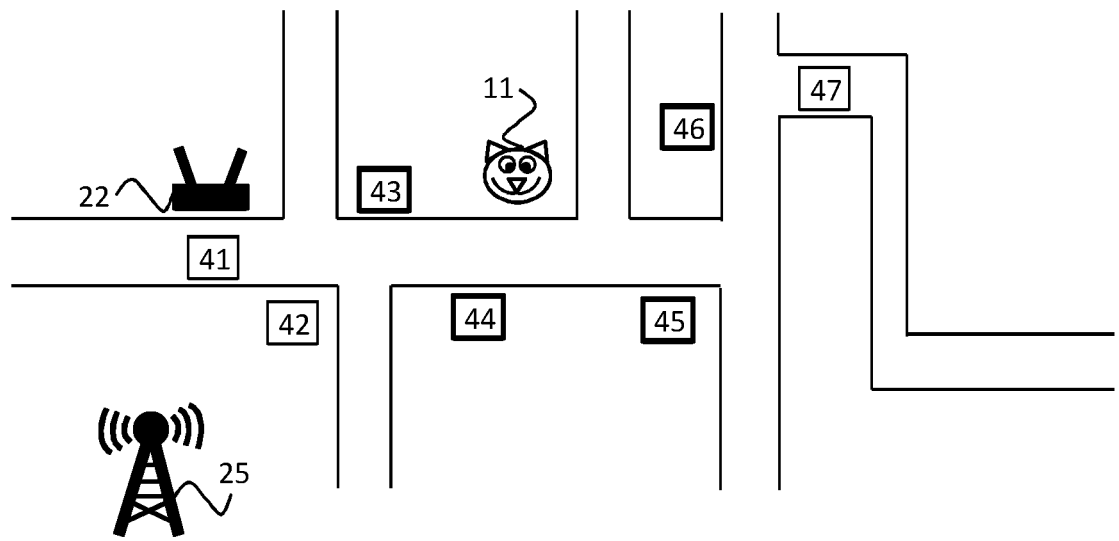
FIG. 5 illustrates the performance of the first embodiment of the method of FIG. 4.

FIG. 5 illustrates the performance of the first embodiment of the method of FIG. 4. In this first embodiment, neither a movement direction of the second device, user device 11, nor a movement direction of other devices is determined in order to determine to which devices to transmit the message. In this first embodiment, the Internet server 55 of FIG. 3, obtains the location of the second device, user device 11, and any other device that has subscribed to a pet tracking application, i.e. user devices 41-47 in the example of FIG. 5. From these locations, the Internet server determines which user devices are within the certain range of the user device 11. This certain range may be 50 meters or 500 meters, for example. In the example of FIG. 5, user devices 43, 43, 45 and 46 are located within this certain range and are transmitted the message by the first device, user device 1 of FIG. 3, or by the Internet server 55.

Figure 6:
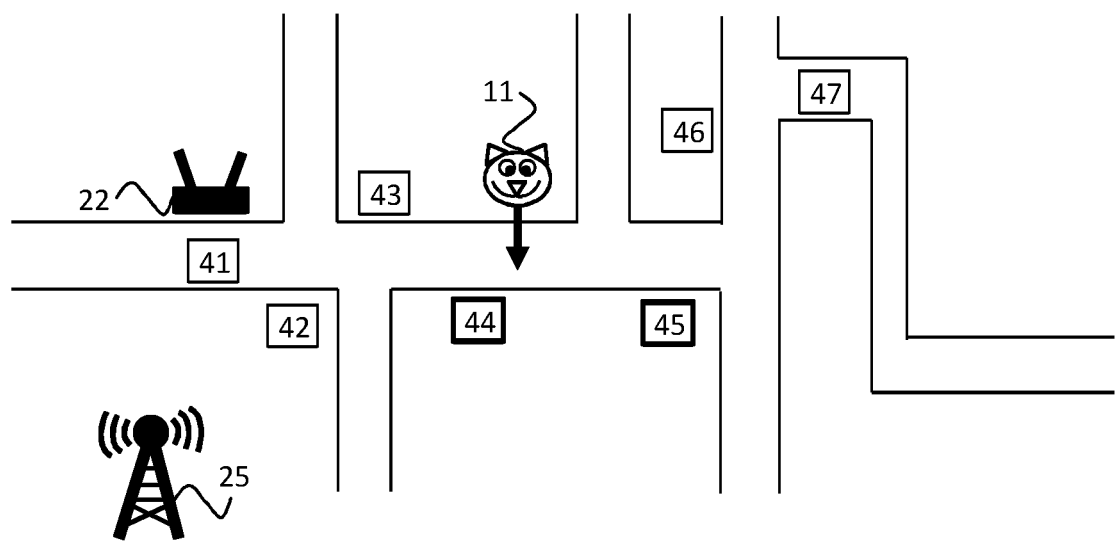
FIG. 6 illustrates the performance of a second embodiment of the method of the invention.

FIG. 6 illustrates the performance of a second embodiment of the method of the invention. In this second embodiment, the method comprises obtaining a movement direction of the second device, user device 11, and identifying the devices within the certain range of the second device further based on the movement direction of the second device. In this second embodiment, no movement directions of other devices are determined in order to determine to which devices to transmit the message In the example of FIG. 6, the user device 11 moves in the direction of user devices 44 and 45 and away from the user devices 43 and 46. Therefore, the message is only transmitted to devices 44 and 45.

Figure 7:
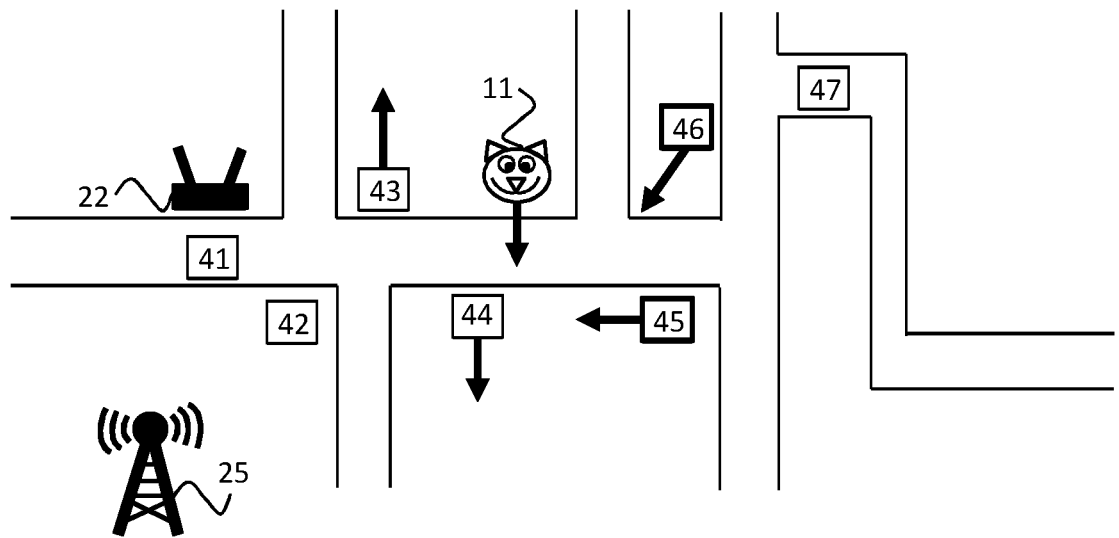
FIG. 7 illustrates the performance of a third embodiment of the method of the invention with a first example.
Figure 8:
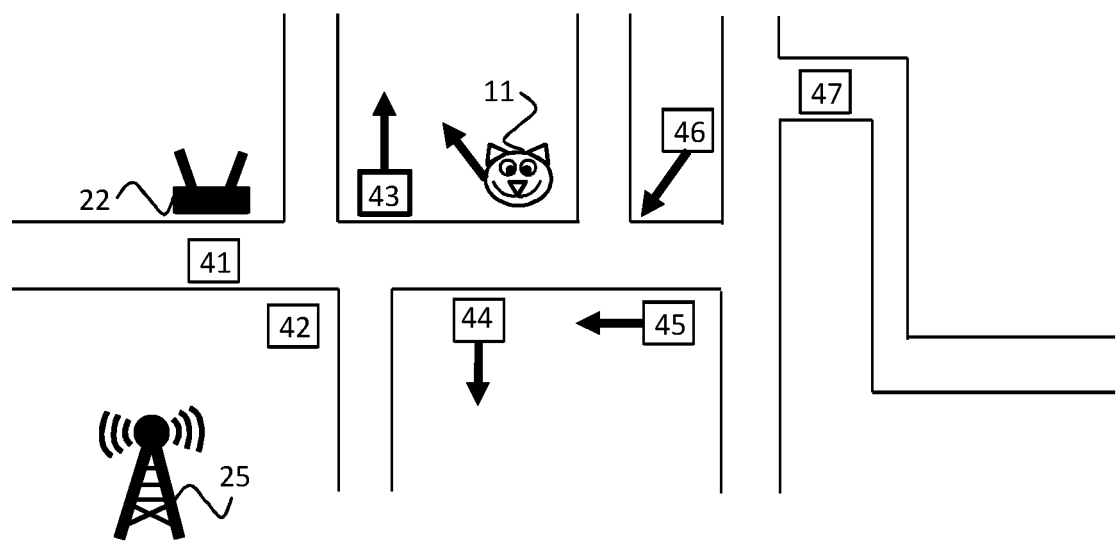
FIG. 8 illustrates the performance of the third embodiment of the method of the invention with a second example.

FIGS. 7 and 8 illustrate the performance of a third embodiment of the method of the invention. In this embodiment, the method comprises obtaining movement directions of other devices that have subscribed to a pet tracking application and identifying the devices within the certain range of the second device further based on the movement directions of these devices.

In the example of FIG. 7, the user device 11 is moving in the direction of user devices 44 and 45, but user device 44 is moving in the same direction, away from the user device 11. The message is therefore not transmitted to user device 44. The user device 45 is moving in a direction in which it might come close to the user device 11. The message is therefore transmitted to the user device 45. User device 11 is not moving in the direction of user device 46, but user device 46 is moving in a similar direction as user device 11 and in a direction in which it might come close to the user device 11. The message is therefore also transmitted to the user device 46. User device 11 is not moving in the direction of user device 43 and user device 43 is moving in the opposite direction compared to user device 11, away from the user device 11. The message is therefore not transmitted to user device 43.

In the example of FIG. 8, the user device 11 is moving away from user devices 44 and 45. Of the four user devices 43-46 within the certain range of the second device (user device 11), only user device 43 is expected to come close to user device 11. The message is therefore only transmitted to user device 43. The movement direction of the user devices may be determined using information from a compass in these device and/or from consecutive locations of these devices, for example.

Figure 9:
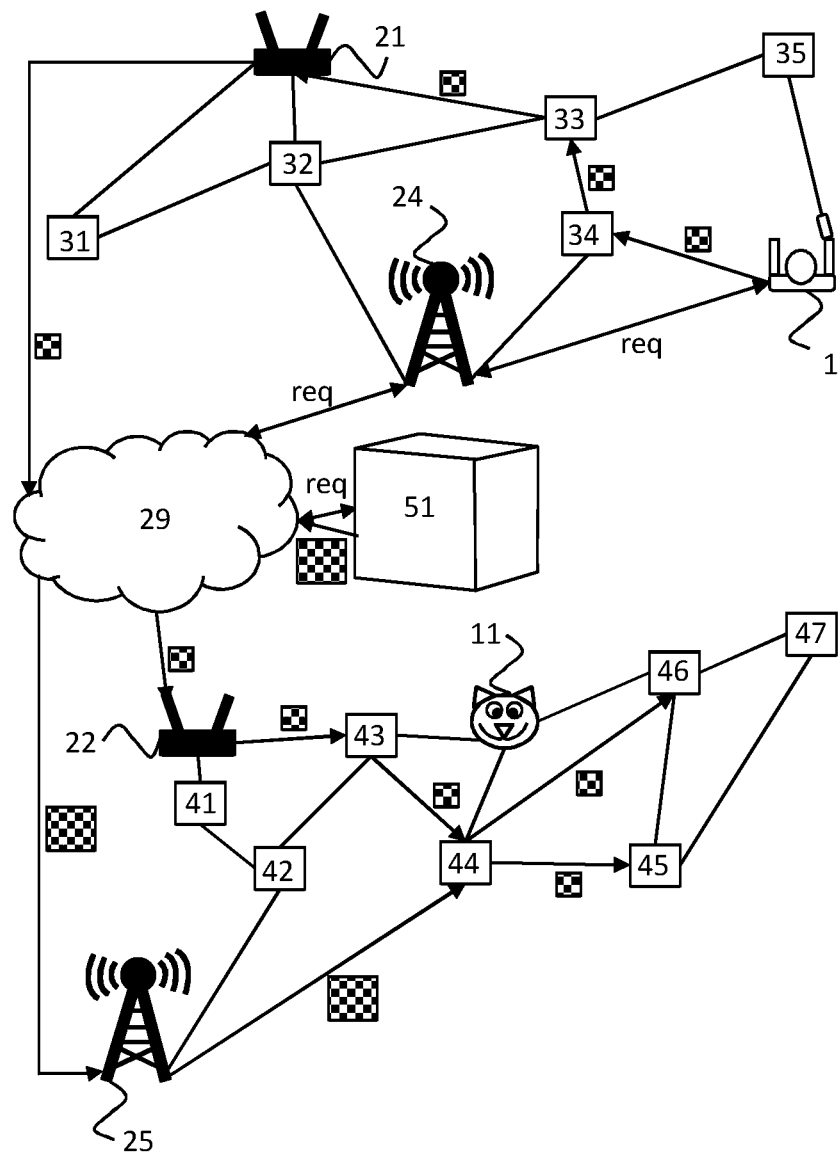
FIG. 9 shows an example of data passing through the mesh network of FIG. 2 in the first embodiment of the method of FIG. 4.

FIG. 9 shows an example of data passing through the mesh network of FIG. 2 in the first embodiment of the method of FIG. 4. In the first embodiment of FIGS. 4 and 9, the message is transmitted both by the first device, user device 1, and by the Internet server 51. User device 1 transmits an image of a first size to at least one of the devices within the certain range of the second device and the Internet server 51 transmits an image of a second size to at least one of the devices within the certain range of the second device. The second size is larger than the first size, e.g. at least ten times larger.

The first size may be less than 2 KB and the first size may be more than 50 KB, for example. In order to reduce an image of 50 KB or larger to an image of 2 KB or less, the following process may be used, for example:
1. The image's dimensions are resized to 200 by 200 pixels.
2. The color image is transformed into an 8-bit grey scale version of the image.
3. The Least Significant Byte (LSB) of all the resulting bytes of the image are reset to 0. This will help with the lossless Run-Length-Encoding (RLE) step that follows.
4. The Run-Length-Encoding lossless compression algorithm is applied to the image. RLE follows a process of counting the repeating bytes of information in a file and encodes them as number of repetitions followed by the actual byte. For instance, the next byte sequence:

| 10 | 10 | 10 | 10 | 31 | 31 | 31 | would be encoded as:

| 4 | 10 | 3 | 31 |

5. Increase the compression ratio by performing Huffman coding, which is a lossless image compression technique.

Step 1 ensures that the maximum image size is kept below 50K. Step 2 reduces the bit-width from 24 to 8, dividing the size by 3. It's very common for images to have long sequences of repeating bytes, and step 3 helps to maximize this. With step 4, the size can then be further reduced by a factor of 4 to 5. In step 5 the compression ratio is doubled with Huffman coding. After this, a photograph that was originally 50 KB in size, may be shrunk to less than 2 KB.

In the embodiment of FIGS. 4 and 9, the Internet server 51 transmits the image of the second size, i.e. the "large" image, to one or more devices connected to the Internet server 51 and the user device 1 transmits the image of the first size, i.e. the "small" image, to one or more devices not connected to the Internet server.

Before the user device 1 and the Internet server 51 transmit the message, the user of user device 1 first requests transmission of the message. This request is forwarded by the user device 1 to the Internet server 51 via base station 24 and Internet 29. Since the user device 1 wants to transmit the message itself to user devices not connected to the Internet server 51, the Internet server 51 transmits information identifying addresses of user devices within the certain range of the second device (user device 11) that are not connected to the Internet server 51 to the first device (user device 1).

In the example of FIG. 9, user device 44 is within the certain range of the user device 11 and is connected to the Internet server 51, which is possible, as user device 44 is connected to the base station 25. The Internet server transmits the large image to the user device 44 via Internet 29 and base station 25. User devices 43, 45 and 46 are also with the certain range of the user device 11 and are not connected to the Internet server 51. They are not able to connect to the Internet server, as their communication with the Internet 29 has a high latency.

The first device (user device 1) receives information identifying the addresses of user devices 43, 45 and 46 from the Internet server 51 and then transmits the small image to these user devices via user device 34, user device 33, wireless LAN access point 21, and wireless LAN access point 22. After user device 43 receives the small image, it forwards it to user device 44. User device 44 forwards the small image to user devices 45 and 46.

Figure 10:
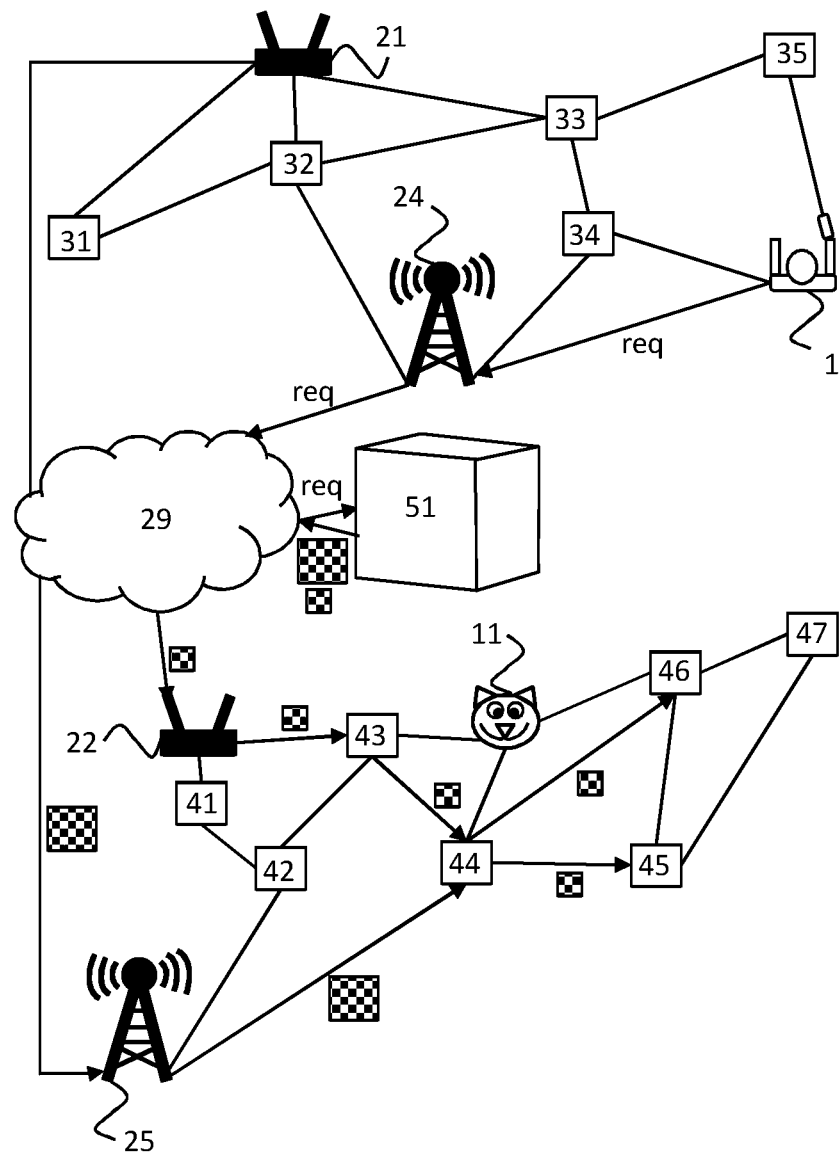
FIG. 10 shows an example of data passing through the mesh network of FIG. 2 in a fourth embodiment of the method of the invention.

FIG. 10 shows an example of data passing through the mesh network of FIG. 2 in a fourth embodiment of the method of the invention. In this fourth embodiment, the message is only transmitted by the Internet server 51. The Internet server 51 transmits both the small image and the large image. The user device 1 forwards the request by the user of the user device 1 in the same manner as described in relation to FIG. 9. However, since the first device (user device 1) does not want to transmit the message itself, the Internet server 51 does not need to transmit information identifying addresses to user device 1.

The Internet server 51 transmits the large image to the user device 44 in the same manner as described in relation to FIG. 9. In the example of FIG. 10, the Internet server 51 transmits the smaller image via the Internet 29 and the wireless LAN access point 22 to user device 43, from where it is forwarded in the same manner as described in relation to FIG. 9. Transmitting the smaller image via the wireless LAN access point 21 instead of via the base station 25 may reduce the cost of transmitting the message.

Figure 11:
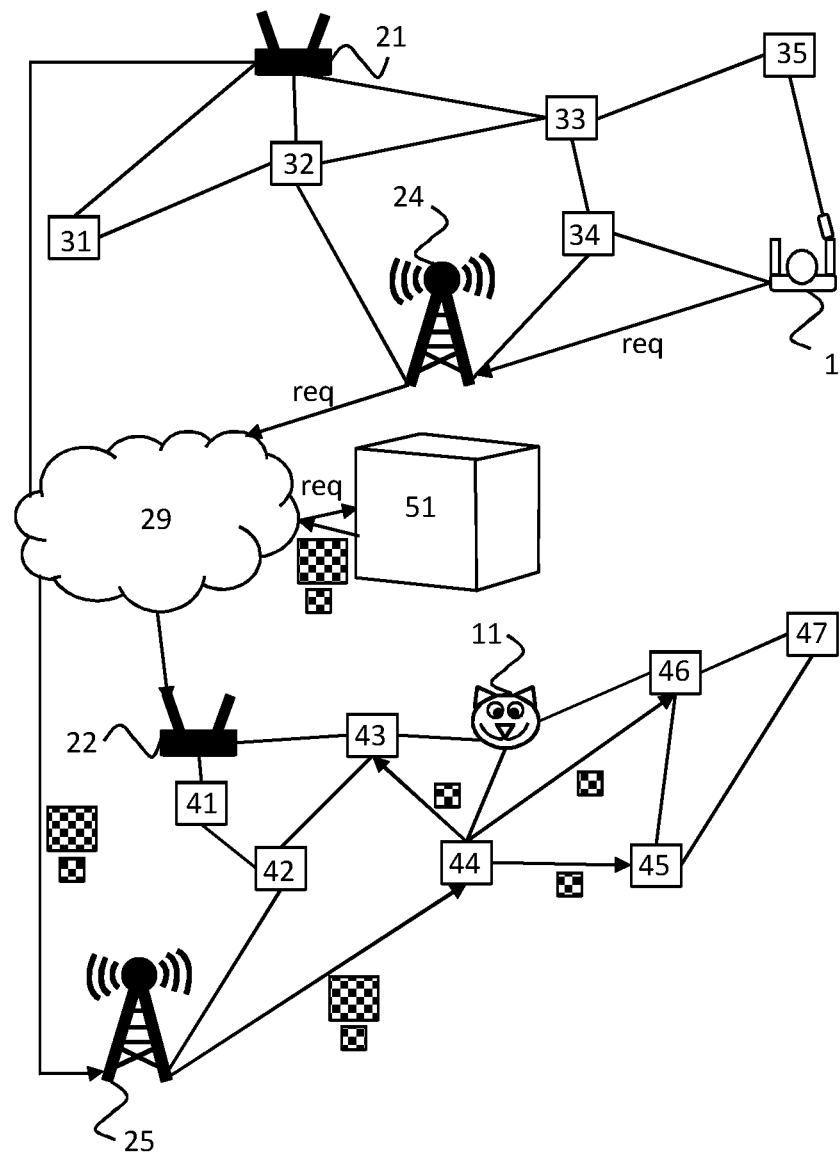
FIG. 11 shows an example of data passing through the mesh network of FIG. 2 in a fifth embodiment of the method of the invention.

FIG. 11 shows an example of data passing through the mesh network of FIG. 2 in a fifth embodiment of the method of the invention. The fifth embodiment of FIG. 11 differs from the fourth embodiment of FIG. 10 in that the Internet server 51 transmits the smaller image via the (e.g. UMTS, LTE or CDMA2000) base station 25 instead of via the wireless LAN access point 22. The user device 44 receives both the larger image and the small image via the base station 25. The user devices 44 then forwards the small image to the user devices 43, 45 and 46.

Figure 12:
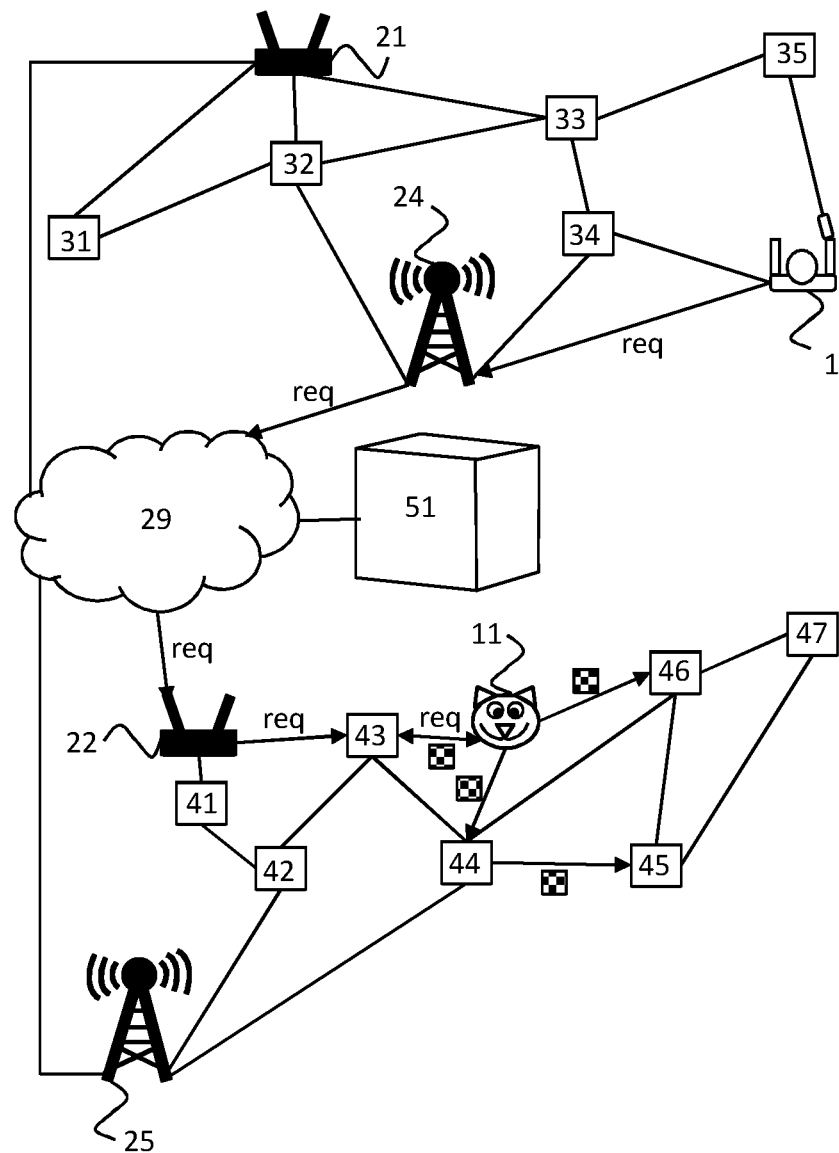
FIG. 12 shows an example of data passing through the mesh network of FIG. 2 in a sixth embodiment of the method of the invention.

FIG. 12 shows an example of data passing through the mesh network of FIG. 2 in a sixth embodiment of the method of the invention. In this sixth embodiment, the message is (only) transmitted by the second device (user device 11). This has as benefit that user devices do not need to share its location with other devices.

In the sixth embodiment of FIG. 12, the first device (user device 1) forwards the request by the user of the first device to the second device (user device 11) instead of to the Internet server 51. In the example of FIG. 12, the request is transmitted to the user device 11 via the base station 24, the Internet 29, the wireless LAN access point 22 and the user device 43.

In the sixth embodiment of FIG. 12, the second device (user device 11) broadcasts the message comprising the small image. This broadcast is received by user devices 43, 44 and 46. User devices 43, 44 and 46 rebroadcast the message in dependence on a distance between their current location and the location of the second device (user device 11). This distance is preferably smaller than or equal to the certain range. In this sixth embodiment, the broadcast message comprises the certain range and a distance threshold is determined by the user device based on the certain range. Furthermore, if the distance is larger than the certain range, then the user device will not present the message to its user.

In the example of FIG. 12, the distance between user device 46 and user device 11 is larger than the determined distance threshold and the user device 46 does not rebroadcast the message. The distance between user devices 43 and 44 and user device 11 is smaller than the determined distance threshold and the user devices 43 and 44 therefore rebroadcast the message. The message rebroadcast by user device 43 is received by user device 44 and the message rebroadcast by user device 44 is received by user devices 43 and 46. However, these user devices are able to detect that they have already received this message (e.g. from a message ID or by comparing characteristics of the message or contents of the message text) and do not present the message to their users again.

The message rebroadcast by user device 43 is also received by user device 42, but user device 42 determines that it is not within the certain range of the second device (user device 11) and disregards the message. The message rebroadcast by user device 44 is also received by user device 45. User device 45 determines that it is within the certain range of the second device (user device 11) and presents the message to its user.

Figure 13:
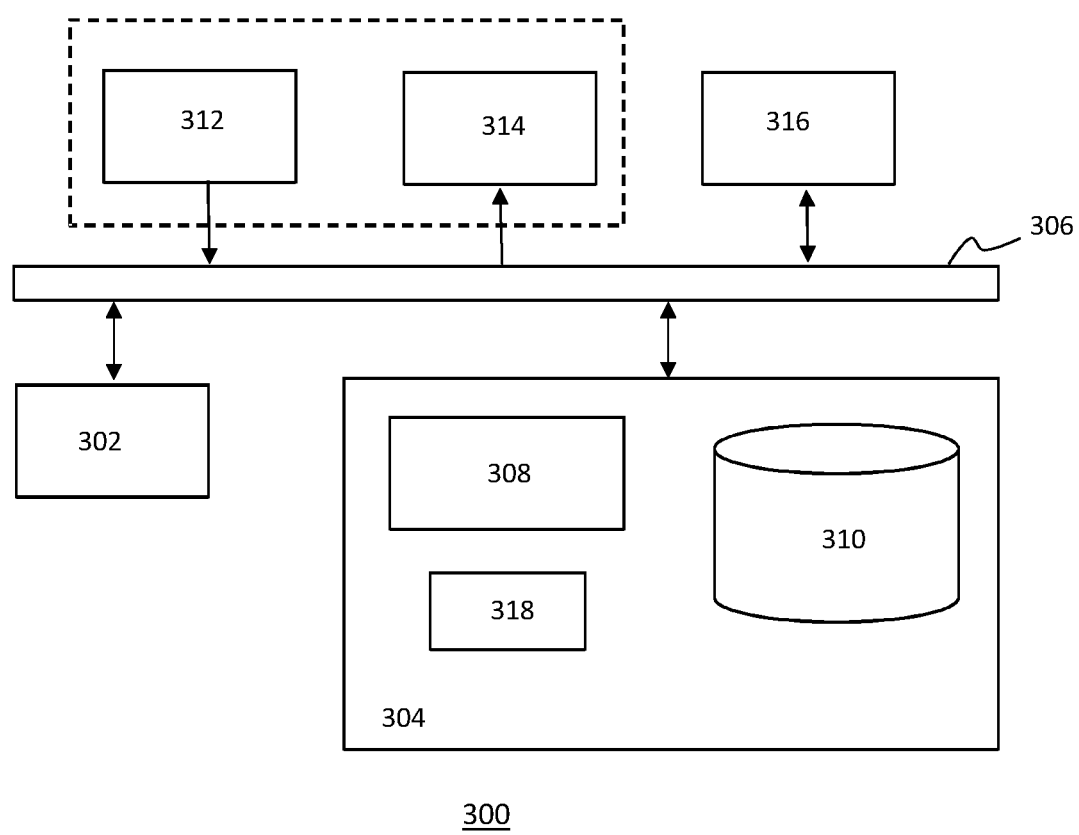
FIG. 13 is a block diagram of an exemplary data processing system for performing the methods of the invention.

FIG. 13 depicts a block diagram illustrating an exemplary data processing system that may perform the method as described with reference to FIGS. 4-12.

As shown in FIG. 13, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 13 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 13, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 13) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

What is claimed is:

1. A method of transmitting a message, the method comprising an Internet server:
    receiving, from a user of a first device, a request for transmission of a message, the message comprising an image of a missing animal, person, or object;
    obtaining a location of a second device;
    identifying a plurality of devices within a certain range of the second device; and
    transmitting the message to at least one of the devices within the certain range of the second device, wherein:
        the devices within the certain range of the second device are identified based on (i) obtained movement direction of the second device and/or (ii) obtained movement directions of the devices;
        the first device and/or the second device transmits a message comprising an image of the missing animal, person, or object having a first size that is smaller than a second size of the image transmitted by the Internet server;
        the second device receives the request and broadcasts the message to at least one of the devices within the certain range of the second device in response to the request and a nearby device receiving the broadcast rebroadcasts the message in dependence on a distance between a current location of the nearby device and the location of the second device;
        the Internet server transmits the message having the image of the second size to one or more of the devices connected to the Internet server; and
        the first device and/or the second device transmits the message having the image of the first size to one or more of the devices not connected to the Internet server.

2. The method as claimed in claim 1, wherein said second size is at least ten times larger than said first size.

3. The method as claimed in claim 1, wherein said plurality of devices is associated with a plurality of users and said plurality of users is associated with said user of said first device.

4. The method as claimed in claim 1, wherein said movement direction of said second device is determined using information from a compass in said second device and/or from consecutive locations of said second device.

5. The method as claimed in claim 1, wherein said movement directions of said devices are determined using information from a compass in said devices and/or from consecutive locations of said devices.

6. A non-transitory computer readable medium for storing instructions, when executed on an Internet server, perform a method of transmitting a message, said method comprising:
    receiving, from a user of a first device, a request for transmission of a message, the message comprising an image of a missing animal, person, or object;

obtaining a location of a second device;
identifying a plurality of devices within a certain range of the second device; and
transmitting the message to at least one of the devices within the certain range of the second device, wherein:
  the devices within the certain range of the second device are identified based on (i) obtained movement direction of the second device and/or (ii) obtained movement directions of the devices;
  the first device and/or the second device transmits a message comprising an image of the missing animal, person, or object having a first size that is smaller than a second size of the image transmitted by the Internet server;
  the second device receives the request and broadcasts the message to at least one of the devices within the certain range of the second device in response to the request and a nearby device receiving the broadcast rebroadcasts the message in dependence on a distance between a current location of the nearby device and the location of the second device;
  the Internet server transmits the message having the image of the second size to one or more of the devices connected to the Internet server; and
  the first device and/or the second device transmits the message having the image of the first size to one or more of the devices not connected to the Internet server.

7. An Internet server, comprising at least one processor configured to:
receive, from a user of a first device, a request for transmission of a message, the message comprising an image of a missing animal, person, or object;
obtain a location of a second device;
identify a plurality of devices within a certain range of the second device; and
transmit the message to at least one of the devices within the certain range of the second device, wherein:
  the devices within the certain range of the second device are identified based on (i) obtained movement direction of the second device and/or (ii) obtained movement directions of the devices;
  the first device and/or the second device transmits a message comprising an image of the missing animal, person, or object having a first size that is smaller than a second size of the image transmitted by the Internet server;
  the second device receives the request and broadcasts the message to at least one of the devices within the certain range of the second device in response to the request and a nearby device receiving the broadcast rebroadcasts the message in dependence on a distance between a current location of the nearby device and the location of the second device;
  the Internet server transmits the message having the image of the second size to one or more of the devices connected to the Internet server; and
  the first device and/or the second device transmits the message having the image of the first size to one or more of the devices not connected to the Internet server.

* * * * *